US011950677B2

(12) United States Patent
Miller et al.

(10) Patent No.: US 11,950,677 B2
(45) Date of Patent: Apr. 9, 2024

(54) DEVICES AND METHODS FOR ELECTROSTATIC APPLICATION OF COSMETICS

(71) Applicant: L'Oreal, Paris (FR)

(72) Inventors: Zane Bowman Allen Miller, Seattle, WA (US); Kyle Harris Yeates, Redmond, WA (US); Sam Benjamin Goldberg, Seattle, WA (US); Joseph Eric Skidmore, Sedona, AZ (US); Lily Truong, Redmond, WA (US); Julian John Trowbridge, Seattle, WA (US)

(73) Assignee: L'Oreal, Paris (FR)

(*) Notice: Subject to any disclaimer, the term of this patent is extended or adjusted under 35 U.S.C. 154(b) by 1020 days.

(21) Appl. No.: 16/805,211

(22) Filed: Feb. 28, 2020

(65) Prior Publication Data

US 2020/0275758 A1 Sep. 3, 2020

Related U.S. Application Data

(60) Provisional application No. 62/811,843, filed on Feb. 28, 2019.

(51) Int. Cl.
*A45D 33/02* (2006.01)
*B05B 5/03* (2006.01)

(52) U.S. Cl.
CPC .......... *A45D 33/02* (2013.01); *A45D 2200/10* (2013.01); *A45D 2200/202* (2013.01); *B05B 5/032* (2013.01)

(58) Field of Classification Search
CPC ................ A45D 33/02; A45D 2200/10; A45D 2200/202; B05B 5/032
USPC .......................................................... 604/290
See application file for complete search history.

(56) References Cited

U.S. PATENT DOCUMENTS

| | | | | |
|---|---|---|---|---|
| 4,744,516 | A | | 5/1988 | Peterson et al. |
| 5,145,331 | A | | 9/1992 | Goes et al. |
| 5,518,546 | A | * | 5/1996 | Williams .............. B05B 5/1683 427/195 |
| 5,704,554 | A | * | 1/1998 | Cooper ..................... B05B 5/03 239/692 |
| 5,863,497 | A | * | 1/1999 | Dirksing ................ B05B 5/025 134/1 |

(Continued)

FOREIGN PATENT DOCUMENTS

| | | |
|---|---|---|
| DE | 2249291 A1 | 4/1974 |
| DE | 2324597 A1 | 12/1974 |

(Continued)

*Primary Examiner* — Andrew J Mensh
(74) *Attorney, Agent, or Firm* — Christensen O'Connor Johnson Kindness PLLC

(57) ABSTRACT

Devices and methods for electrostatic application of cosmetics are described. In one embodiment, a system for electrostatic deposition of cosmetic material on a surface includes: a housing; a nozzle configured for breaking the cosmetic material into cosmetic particles and for directing the cosmetic particles out of the housing and toward the surface; and a reservoir configured for holding the cosmetic material. The reservoir is connected to the nozzle. The system also includes an airflow conduit configured to provide air to the nozzle; and a nozzle electrode configured proximately to the nozzle. The nozzle electrode is configured to charge the cosmetic particles.

21 Claims, 11 Drawing Sheets

(56) References Cited

U.S. PATENT DOCUMENTS

| | | | | |
|---|---|---|---|---|
| 7,462,242 | B2 * | 12/2008 | Cooper | A61M 35/25 604/289 |
| 2004/0177807 | A1 * | 9/2004 | Pui | B05B 5/081 239/690 |
| 2009/0025747 | A1 * | 1/2009 | Edgar | B41J 3/4073 132/320 |
| 2009/0200392 | A1 * | 8/2009 | Duru | B05B 17/0623 424/401 |
| 2010/0061182 | A1 | 3/2010 | Gohring et al. | |
| 2010/0123020 | A1 | 5/2010 | Gohring et al. | |
| 2010/0123024 | A1 | 5/2010 | Göhring et al. | |
| 2015/0360015 | A1 * | 12/2015 | Rabe | A61M 35/003 604/290 |
| 2019/0014651 | A1 | 1/2019 | Trutwig et al. | |

FOREIGN PATENT DOCUMENTS

| | | | |
|---|---|---|---|
| DE | 2324598 | A1 | 12/1974 |
| DE | 2333655 | A1 | 1/1975 |
| DE | 2336986 | A1 | 2/1975 |
| DE | 2349080 | A1 | 4/1975 |
| DE | 2630058 | B1 | 6/1977 |
| DE | 2624861 | B1 | 12/1977 |
| DE | 2653981 | A1 | 6/1978 |
| DE | 2800573 | A1 | 7/1979 |
| DE | 2819028 | A1 | 11/1979 |
| DE | 2910025 | A1 | 9/1980 |
| DE | 2923284 | A1 | 12/1980 |
| DE | 3018687 | A1 | 12/1981 |
| DE | 3020539 | A1 | 12/1981 |
| DE | 3027314 | A1 | 2/1982 |
| DE | 3211992 | A1 | 10/1983 |
| DE | 3222595 | A1 | 12/1983 |
| DE | 3230247 | A1 | 2/1984 |
| DE | 3331617 | A1 | 3/1985 |
| DE | 3331784 | A1 | 3/1985 |
| DE | 3339222 | A1 | 5/1985 |
| DE | 3423094 | A1 | 1/1986 |
| DE | 3442286 | A1 | 2/1986 |
| DE | 3507331 | A1 | 9/1986 |
| DE | 3910179 | C1 | 3/1990 |
| DE | 3919959 | C1 | 11/1990 |
| DE | 3928949 | A1 | 3/1991 |
| DE | 3943585 | A1 | 6/1991 |
| DE | 4025109 | C1 | 11/1991 |
| DE | 4207302 | A1 | 9/1993 |
| DE | 4225072 | A1 | 2/1994 |
| DE | 4231824 | A1 | 3/1994 |
| DE | 4232439 | A1 | 4/1994 |
| DE | 4323733 | C1 | 9/1994 |
| DE | 4320541 | A1 | 12/1994 |
| DE | 4411951 | C1 | 7/1995 |
| DE | 19514316 | C1 | 8/1996 |
| DE | 19607095 | C1 | 4/1997 |
| DE | 19542527 | A1 | 5/1997 |
| DE | 19542663 | A1 | 5/1997 |
| DE | 29604196 | U1 | 5/1997 |
| DE | 29604468 | U1 | 5/1997 |
| DE | 29604469 | U1 | 5/1997 |
| DE | 19609896 | A1 | 9/1997 |
| DE | 19626731 | A1 | 1/1998 |
| DE | 29801109 | U1 | 4/1998 |
| DE | 29802027 | U1 | 5/1998 |
| DE | 19705254 | A1 | 8/1998 |
| DE | 29717509 | U1 | 3/1999 |
| DE | 19814328 | A1 | 10/1999 |
| DE | 19814532 | A1 | 10/1999 |
| DE | 29909039 | U1 | 10/1999 |
| DE | 29823736 | U1 | 2/2000 |
| DE | 29819052 | U1 | 4/2000 |
| DE | 29824040 | U1 | 4/2000 |
| DE | 19928607 | A1 | 5/2000 |
| DE | 19909758 | A1 | 9/2000 |
| DE | 19909759 | C1 | 9/2000 |
| DE | 20008051 | U1 | 9/2000 |
| DE | 20013998 | U1 | 11/2000 |
| DE | 20100967 | U1 | 5/2001 |
| DE | 10060732 | A1 | 6/2002 |
| DE | 20107479 | U1 | 10/2002 |
| DE | 20108356 | U1 | 10/2002 |
| DE | 10163535 | A1 | 7/2003 |
| DE | 10201816 | A1 | 7/2003 |
| DE | 10208860 | A1 | 9/2003 |
| DE | 20311585 | U1 | 11/2003 |
| DE | 20313201 | U1 | 12/2003 |
| DE | 20320747 | U1 | 4/2005 |
| DE | 202005015837 | U1 | 2/2006 |
| DE | 202005005054 | U1 | 9/2006 |
| DE | 202007005266 | U1 | 7/2007 |
| DE | 202007007138 | U1 | 8/2007 |
| DE | 102007023366 | A1 | 6/2008 |
| DE | 202007003070 | U1 | 8/2008 |
| DE | 202007005381 | U1 | 9/2008 |
| DE | 202009014663 | U1 | 5/2010 |
| DE | 202009014678 | U1 | 5/2010 |
| DE | 202008017954 | U1 | 1/2011 |
| DE | 102009053449 | A1 | 2/2011 |
| DE | 202010013463 | U1 | 3/2011 |
| DE | 102009048022 | A1 | 4/2011 |
| DE | 102009048023 | A1 | 4/2011 |
| DE | 102010012538 | A1 | 9/2011 |
| DE | 102011100806 | A1 | 11/2012 |
| DE | 102011100970 | A1 | 11/2012 |
| DE | 102012000506 | A1 | 7/2013 |
| DE | 102012003838 | A1 | 8/2013 |
| DE | 102014105074 | A1 | 10/2015 |
| DE | 102015105117 | A1 | 10/2015 |
| DE | 102015105121 | A1 | 10/2015 |
| DE | 202015106132 | U1 | 12/2015 |
| DE | 102014112640 | A1 | 3/2016 |
| DE | 102015101361 | A1 | 8/2016 |
| DE | 102015110883 | A1 | 1/2017 |
| DE | 102016107465 | A1 | 10/2017 |
| DE | 102017103335 | A1 | 8/2018 |
| DE | 102018109452 | A1 | 10/2018 |
| DE | 102018109453 | A1 | 10/2018 |
| DE | 102018109455 | A1 | 10/2018 |
| DE | 102018109456 | A1 | 10/2018 |
| DE | 102018109457 | A1 | 10/2018 |
| EP | 68206 | A2 | 1/1983 |
| EP | 76510 | A2 | 4/1983 |
| EP | 100854 | A1 | 2/1984 |
| EP | 116829 | A1 | 8/1984 |
| EP | 116830 | A1 | 8/1984 |
| EP | 116869 | A2 | 8/1984 |
| EP | 213234 | A1 | 3/1987 |
| EP | 263897 | A1 | 4/1988 |
| EP | 279931 | A2 | 8/1988 |
| EP | 283957 | A2 | 9/1988 |
| EP | 337091 | A2 | 10/1989 |
| EP | 346643 | A2 | 12/1989 |
| EP | 347551 | A2 | 12/1989 |
| EP | 363627 | A2 | 4/1990 |
| EP | 415013 | A1 | 3/1991 |
| EP | 442019 | A1 | 8/1991 |
| EP | 453745 | A1 | 10/1991 |
| EP | 616907 | A1 | 9/1994 |
| EP | 780682 | A1 | 6/1997 |
| EP | 803186 | A2 | 10/1997 |
| EP | 803187 | A2 | 10/1997 |
| EP | 904850 | A2 | 3/1999 |
| EP | 959247 | A1 | 11/1999 |
| EP | 1340550 | A2 | 9/2003 |
| EP | 1371421 | A1 | 12/2003 |
| EP | 1387085 | A2 | 2/2004 |
| EP | 1602411 | A2 | 12/2005 |
| EP | 1745854 | A1 | 1/2007 |
| EP | 1818105 | A1 | 8/2007 |
| EP | 1818106 | A1 | 8/2007 |
| EP | 1844860 | A1 | 10/2007 |
| EP | 1880771 | A1 | 1/2008 |
| EP | 2072183 | A1 | 6/2009 |
| EP | 2181773 | A1 | 5/2010 |

(56) References Cited

FOREIGN PATENT DOCUMENTS

| | | | |
|---|---|---|---|
| EP | 2317143 | A2 | 5/2011 |
| JP | 8318183 | A | 12/1996 |
| JP | 9038534 | A | 2/1997 |
| NL | 197407763 | A | 1/1975 |
| WO | 1981002117 | A1 | 8/1981 |

* cited by examiner

DEVICES AND METHODS FOR ELECTROSTATIC APPLICATION OF COSMETICS

CROSS-REFERENCE TO RELATED APPLICATION

This application claims the benefit of U.S. Provisional Application No. 62/811,843, filed Feb. 28, 2019, the contents of which are incorporated herein by reference.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

In one embodiment, a system for electrostatic deposition of cosmetic material on a surface includes: a housing; a nozzle configured for breaking the cosmetic material into cosmetic particles and for directing the cosmetic particles out of the housing and toward the surface; and a reservoir configured for holding the cosmetic material. The reservoir is connected to the nozzle. The system also includes a nozzle electrode configured proximately to the nozzle. The nozzle electrode is configured to charge the cosmetic particles.

In one aspect, the cosmetic particles include solid particles, and the solid particles are configured to receive charge from the nozzle electrode. In another aspect, the cosmetic material is selected from a group consisting of a dry shampoo, a deodorant, an antiperspirant, a baby powder, a hairspray, and a combination thereof.

In one aspect, the system also includes: a target electrode configured for charging the surface; and a controller having instructions, which, when executed, cause the controller to: during a first time period, charge the surface at a first polarity; charge the cosmetic particles at a second polarity, where the second polarity is different from the first polarity; and during a second time period, repel the cosmetic particles from the surface by charging the surface at the second polarity.

In another aspect, the system also includes: a target electrode configured for charging the surface; and a controller having instructions, which, when executed, cause the controller to: charge the surface at a first polarity; during a first time period, charge the cosmetic particles at a second polarity, where the second polarity is different from the first polarity; and after the first time period, charge the cosmetic particles at the first polarity.

In one aspect, the reservoir is a first reservoir, the cosmetic material is a first cosmetic material, and the cosmetic particles are first cosmetic particles. The system further includes: a second reservoir configured for holding a second cosmetic material, where the nozzle electrode is configured to charge second cosmetic particles of the second cosmetic material.

In another aspect, the nozzle is a first nozzle, and the nozzle electrode is a first nozzle electrode, and the system also includes: a second nozzle configured for breaking the second cosmetic material into the second cosmetic particles and for directing the second cosmetic particles toward the surface; and a second nozzle electrode configured proximately to the second nozzle, where the second nozzle electrode is configured to charge the cosmetic particles.

In one aspect, the first nozzle electrode has a first polarity and the second nozzle electrode has a second polarity, and the first polarity is different from the second polarity. In another aspect, the first nozzle electrode has a first polarity and the second nozzle electrode has a second polarity, and the first polarity is the same as the second polarity.

In one aspect, the system also includes: a target electrode configured for charging the surface, where a polarity of the target electrode is different than the first polarity.

In one aspect, the first reservoir is a first insertable cartridge, and the second reservoir is a second insertable cartridge. In another aspect, the first material in the first insertable cartridge is pre-charged to a pre-determined charge.

In one aspect, the first cosmetic particles of the first cosmetic material and the second cosmetic particles of the second cosmetic material are configured to chemically react.

In one aspect, the system also includes: a plurality of target electrodes configured over the surface, where the plurality of target electrodes form a plurality of charge zones on the surface; and a controller having instructions, which, when executed, cause the controller to: set polarities of individual charge zones of the plurality of charge zones at a first polarity or a second polarity different from the first polarity; and charge the cosmetic particles at the first polarity or the second polarity.

In one embodiment, a method for electrostatic deposition of cosmetic material on a surface includes: flowing the cosmetic material from a reservoir to a nozzle; breaking the cosmetic material into cosmetic particles in the nozzle; charging the cosmetic particles by a nozzle electrode; directing the cosmetic particles toward the surface; and depositing the cosmetic particles on the surface.

In one aspect, the cosmetic particles comprise solid particles, and the solid particles are configured to receive charge from the nozzle electrode. In one aspect, the cosmetic material is selected from a group consisting of a dry shampoo, a deodorant, an antiperspirant, a baby powder, a hairspray, and a combination thereof.

In one aspect, the cosmetic material is held in an insertable cartridge. In another aspect, the insertable cartridge is pre-charged to a pre-determined charge.

In one aspect, the cosmetic particles are charged at a first polarity, and the method further includes: charging the surface at a second polarity by a target electrode, wherein the first polarity is different from the second polarity; and repelling the cosmetic particles from the surface by charging the surface at the first polarity.

In one aspect, the cosmetic particles are charged at a first polarity, and the method also includes: charging the surface at a second polarity by a target electrode; after charging the cosmetic particles at the first polarity, charging the cosmetic particles at the second polarity; and depositing the cosmetic particles at the second polarity over the cosmetic particles at the first polarity.

In one aspect, the cosmetic particles are first cosmetic particles charged at a first polarity, and the method also includes: after charging the cosmetic particles at the first polarity, charging the cosmetic particles at the second polarity; and depositing the cosmetic particles at the second polarity over the cosmetic particles at the first polarity.

In one aspect, the cosmetic material is a first cosmetic material, and the cosmetic particles are first cosmetic particles charged at a first polarity, and the method further includes: charging second cosmetic particles of a second cosmetic material to a second polarity; simultaneously flowing the first cosmetic particles and the second cosmetic particles toward the surface; and mixing the first cosmetic particles and the second cosmetic particles as the first cosmetic particles and the second cosmetic particles flow toward the surface.

In one aspect, the first cosmetic particles of the first cosmetic material and the second cosmetic particles of the second cosmetic material chemically react as the first cosmetic particles and the second cosmetic particles flow toward the surface. In another aspect, the first cosmetic particles of the first cosmetic material and the second cosmetic particles of the second cosmetic material chemically react on the surface.

In one aspect, the method also includes: depositing a plurality of target electrodes over the surface, where the plurality of target electrodes form a plurality of charge zones on the surface; and setting polarities of individual charge zones of the plurality of charge zones at a first polarity or a second polarity different from the first polarity; and directing the cosmetic particles at the first polarity or the second polarity toward the charge zones on the surface.

DESCRIPTION OF THE DRAWINGS

The foregoing aspects and advantages of the inventive technology will become more readily appreciated as the same become better understood by reference to the following detailed description, when taken in conjunction with the accompanying drawings, wherein.

DETAILED DESCRIPTION

Figure 1:
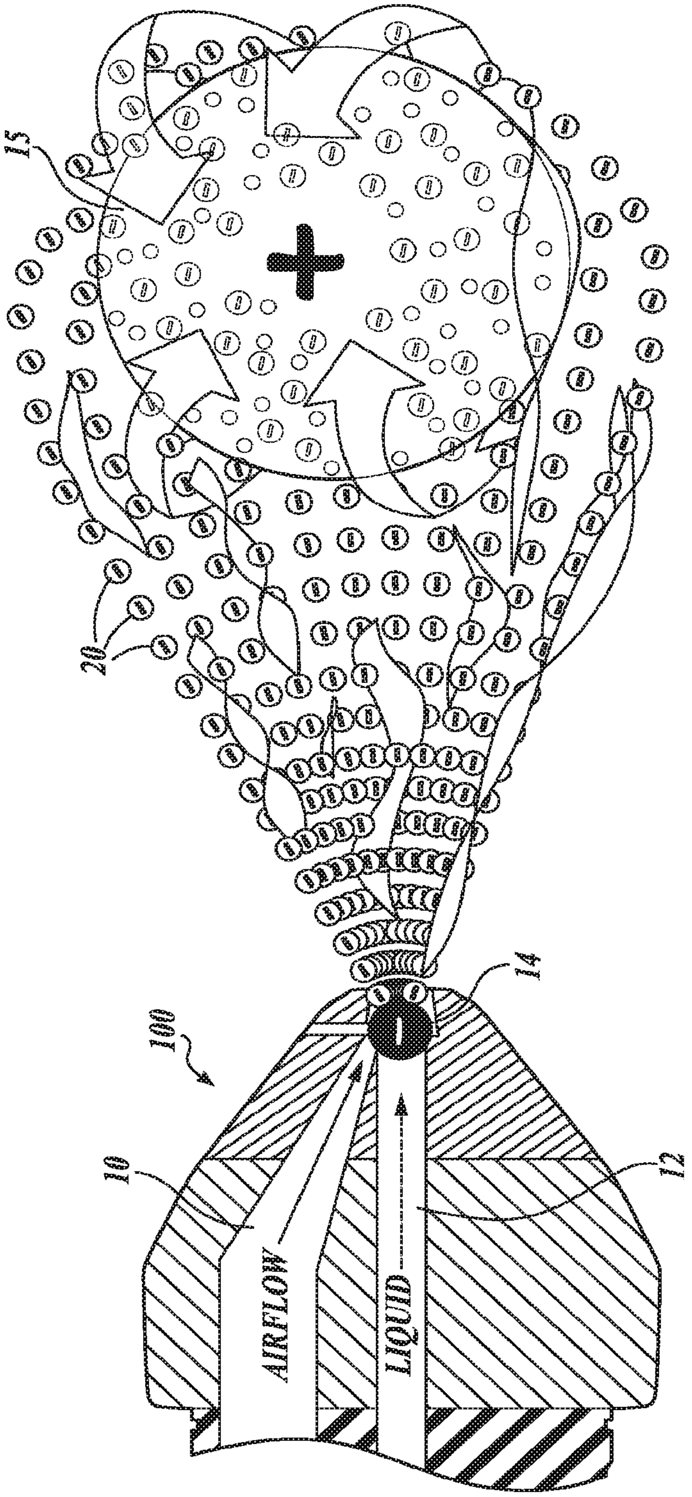
FIG. 1 (PRIOR ART)
FIG. 1 is a schematic diagram of an electrostatic sprayer in accordance with prior art.

While several embodiments have been illustrated and described, it will be appreciated that various changes can be made therein without departing from the spirit and scope of the inventive technology.

Briefly described, in some embodiments of the inventive technology, an electrostatic sprayer carries cosmetic material, for example, in a reservoir or in a replaceable cartridge. In operation, cosmetic material enters an air flow in a sprayer nozzle, causing the cosmetic material to be "air-atomized" into spray particles (cosmetic particles). The resulting cosmetic particles may be electrostatically charged by an electrode placed inside the nozzle or proximately to the nozzle. When the flow of air that carries these charged cosmetic particles is directed toward a surface (e.g., skin of face, hands, legs or other biological surface), the charged cosmetic particles attach to the surface (also referred to as "the surface"), especially if the polarity of the surface is opposite from that of the charged cosmetic particles. Furthermore, these opposite polarities promote spreading of the cosmetic particles over the surface.

Generally, a surface naturally tends to assume a negative polarity. In some embodiments, the polarity of the surface is controllable by an electrode attached to the surface. In some embodiments, charged cosmetic particles are first attached to the surface at a first polarity that is opposite from the instantaneous polarity the surface. Next, the polarity of the surface is inverted, which repels the already attached charged cosmetic particles away from the surface. Such a sequence of attaching/repelling the charged cosmetic particles may be used to control a length of time during which cosmetic material is in contact with skin.

In some embodiments, the electrostatic sprayer deposits multiple layers of charged cosmetic particles. For example, in a first step, charged cosmetic particles having a first polarity are directed to the surface and attached thereto. In a second step, polarity of the charged cosmetic particles may be inverted, such that the newly atomized charged cosmetic particles better attach to the already attached layer on the surface. The two layers of the charged cosmetic particles may correspond to the same or different cosmetic materials.

In some embodiments, printable electrical traces and/or electronics may be deposited over a target surface to create, for example, sub-areas of different polarities. In operation, these sub-areas differentially attract charged cosmetic particles, producing a targeted non-uniformity of the cosmetic material application.

In some embodiments, the charged cosmetic particles may be generated at least in part from a pre-treated cosmetic material. For example, cartridges with cosmetic material may be electrically pre-treated to generate charged cosmetic particles. In some embodiments, presence of the charged cosmetic particles, before the cosmetic material is atomized and electrically charged by the electrostatic sprayer, affects the magnitude and/or polarity of the ultimate electrical charge of the particles.

FIG. 1 is a schematic diagram of an electrostatic sprayer 100 in accordance with prior art. The electrostatic sprayer has an airflow conduit 10 and a liquid conduit 12. In operation, liquid material is directed toward the airflow, where the liquid is atomized into relatively small particles. These particles then flow proximately to an electrode 14, which electrically charges the particles. For example, a negatively charged electrode 14 tends to strip positively charged subatomic particles from the stream of the atomized particles 20, therefore making the atomized particles 20 overall negatively charged. As a result, a positively charged target 15 attracts the negatively charged particles 20, therefore promoting retention and distribution of the charged particles over the surface of the positively charged target 15. An analogous scenario exists for the positively charged particles 20 being directed to the negatively charged target 15.

Figure 2:
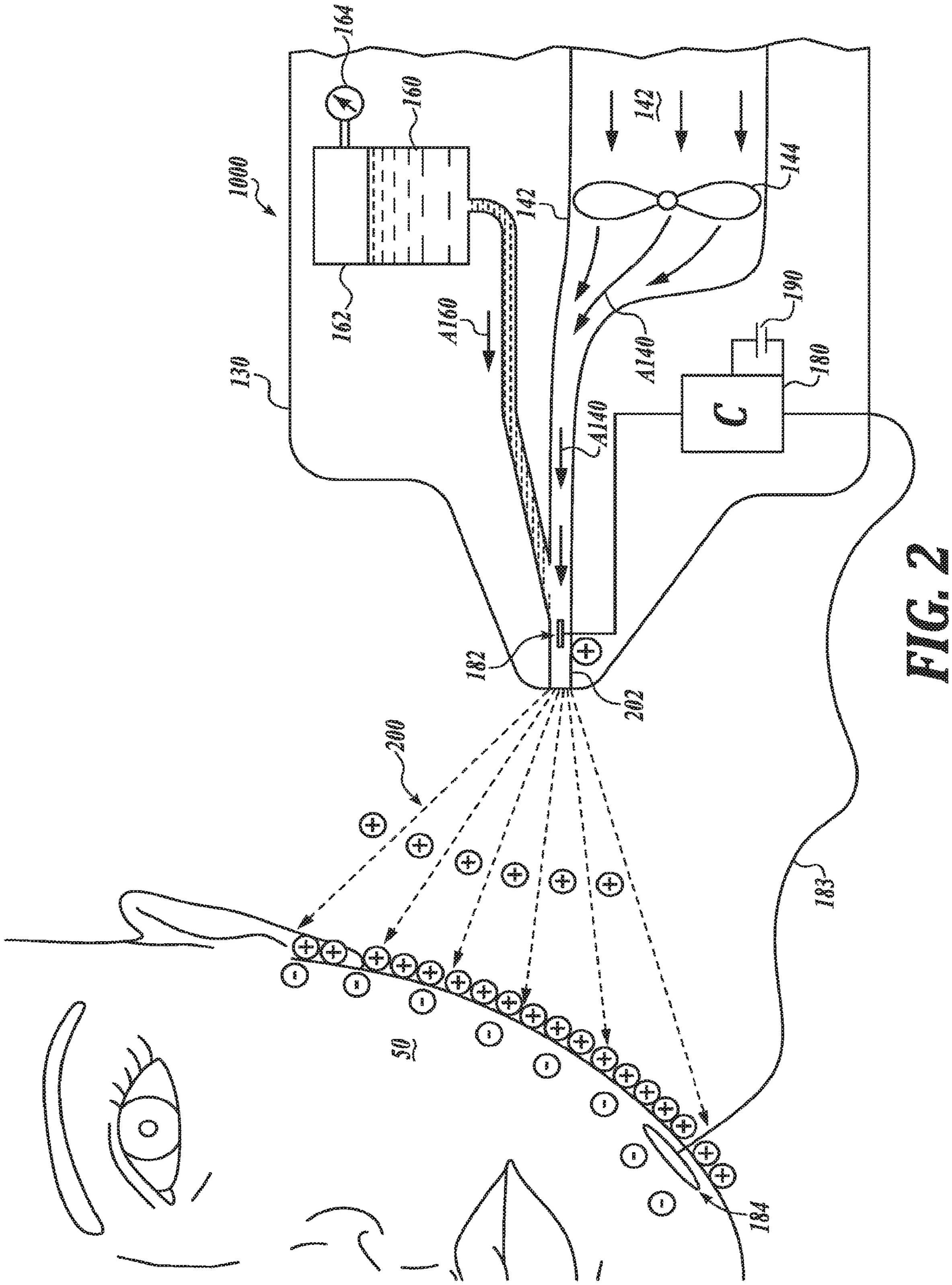
FIG. 2 is a schematic diagram of an electrostatic sprayer in accordance with the inventive technology.

FIG. 2 is a schematic diagram of an electrostatic sprayer 1000 in accordance with the inventive technology. In some embodiments, the electrostatic sprayer 1000 includes an airflow conduit 142 with an air mover 144. In operation, the air mover 144 directs air 140 into the airflow conduit 142 to generate airflow A140. The electrostatic sprayer 1000 also includes cosmetic material 160 carried by a reservoir 162. In operation, cosmetic material 160 flows as a flow A60 toward a sprayer nozzle 202. In some embodiments, a relatively fast airflow A140 draws the cosmetic material 160 into the sprayer nozzle 202, where the cosmetic material is atomized into a flow of relatively small particles (e.g., micron-size or submicron-size particles). In different embodiments, mesh nebulizers or pump sprayers may atomize the cosmetic material 160 instead of or in addition to the airflow in the airflow conduit 142. In some embodiments, cosmetic material includes solid particles. Some nonexclusive examples of such solid particles are present in dry shampoos, deodorants, antiperspirants, baby powders, hairsprays, etc.

In some embodiments, the sprayer nozzle 202 includes a nozzle electrode 182 over which atomized particles flow. In other embodiments, the nozzle electrode 182 may be configured proximately to the nozzle 202 such that the nozzle electrode 182 generates an electromagnetic field in the path of the cosmetic particles 200. Next, the operation of the nozzle electrode 182 imparts electrical charge onto the cosmetic particles 200. Without being bound to theory, it is believed that the positively charged nozzle electrode 182 strips negatively charged sub-atomic particles from the cosmetic particles 200, resulting in an overall positive charge of the cosmetic particles 200. An opposite scenario applies to the negatively charged nozzle electrode 182. In some embodiments, electrostatic charge of the cosmetic particles 200 is controlled by the voltage of the nozzle electrode 182, the velocity of the air in the sprayer nozzle 202, electrical phase of the field generated by the nozzle electrode 182, and/or other parameters. In some embodiments, a charge density of the cosmetic particles 200 is controllable by these parameters.

In operation, the cosmetic particles 200 flow toward target surface, for example, skin 50 of a person's face or other biological surface. Without being bound to theory, it is believed that under typical conditions skin assumes a slightly negative charge, thus attracting the illustrated positively charged cosmetic particles 200. However, in at least some embodiments, the electrical charge of skin 50 may be controllable by a target electrode 184. For example, skin 50 may be charged to a positive charge by the target electrode 184, therefore attracting the negatively charged cosmetic particles 200. In some embodiments, the polarity of the target electrode 184 may be controllable through a conductive line (e.g., conductive wire, conductive cable) by a controller 180 (or other device) of the electrostatic sprayer 1000.

In some embodiments, a source of power 190 (e.g., battery, line voltage) provides power to the components of the electrostatic sprayer 1000. A housing 130 may carry these components, and may include, for example, a handle (not shown). In some embodiments, a level or quantity of the cosmetic material 160 is indicated by an indicator (e.g., pressure gauge, level detected, weight detector) 164.

Figure 3A:
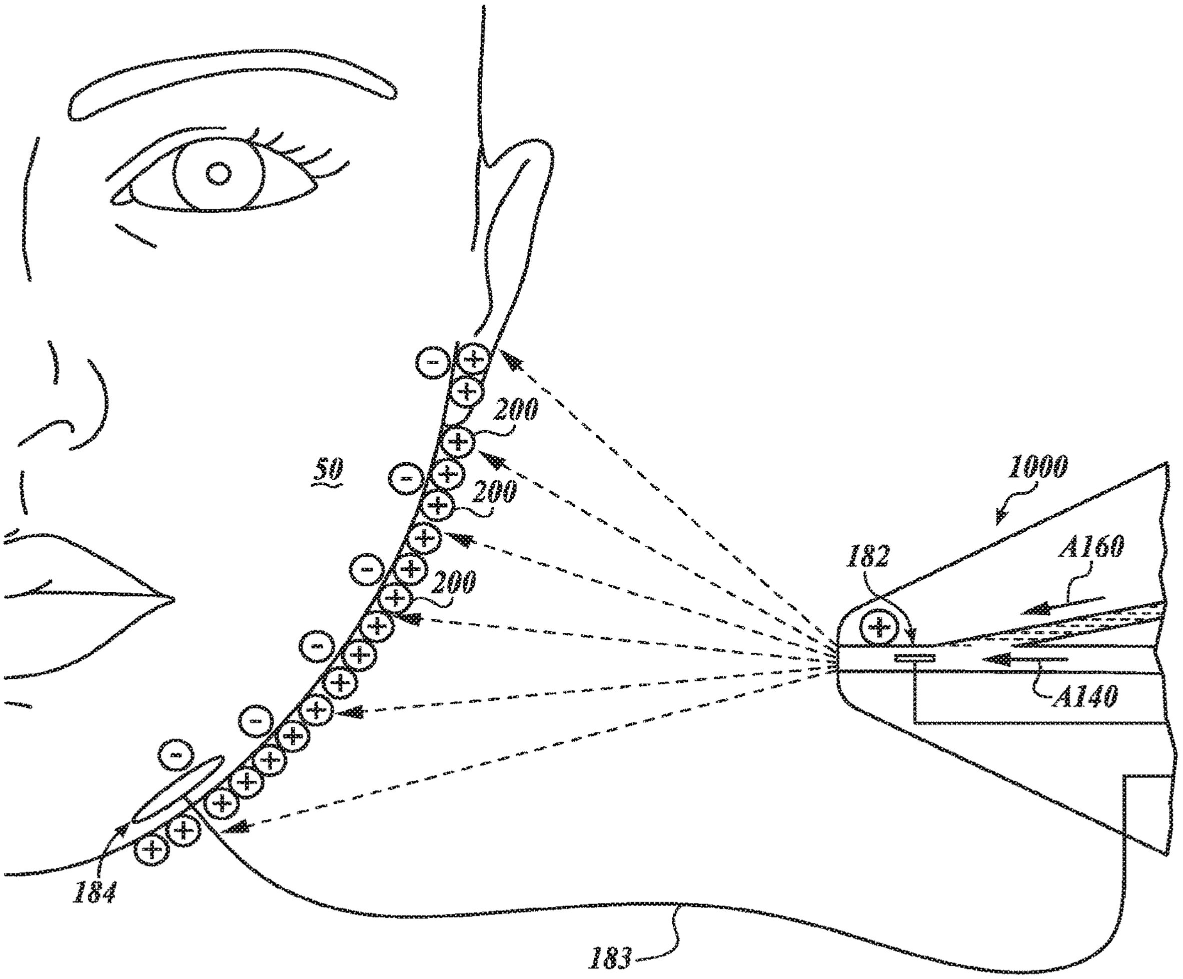
FIGS. 3A and 3B are schematic diagrams of an electrostatic sprayer operating in accordance with the inventive technology.
Figure 3B:
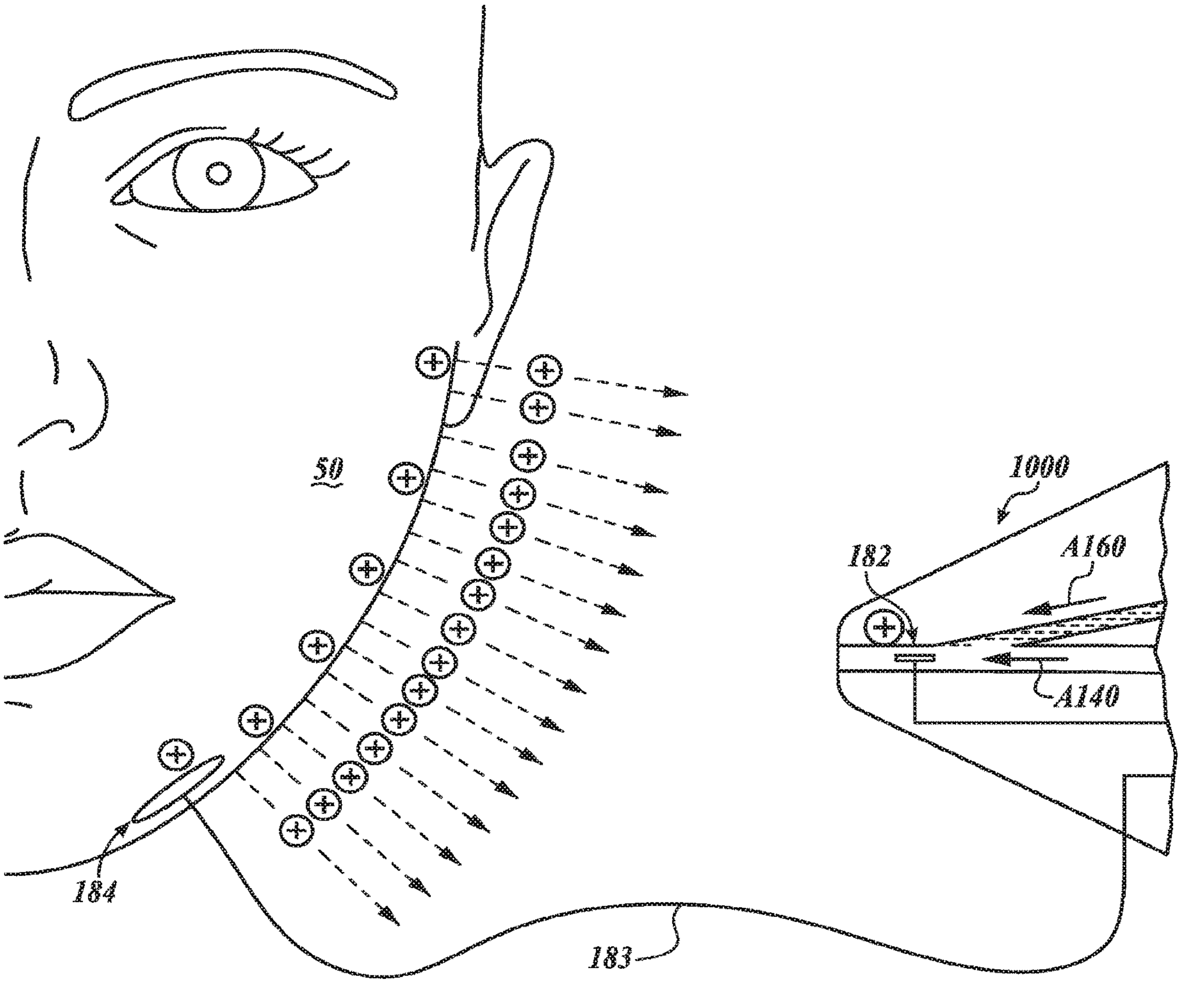

FIGS. 3A and 3B are schematic diagrams of the electrostatic sprayer 100 operating in accordance with the inventive technology. FIG. 3A corresponds to a first step of the illustrated process of applying the cosmetic material, and FIG. 3B corresponds to a second step.

Turning now to FIG. 3A, a flow of cosmetic material A160 may be atomized and electrostatically charged by the nozzle electrode 182. In the illustrated example, the cosmetic particles 200 are charged to a positive electrical charge, which promotes attachment and distribution of the cosmetic particles 200 over the target. As explained above, human skin is normally negatively charged. In some embodiments, a user may want to control the duration of time during which the cosmetics in the cosmetic particles 200 is applied to the skin. Therefore, a mechanism for a removal of the cosmetic particles 200 may be useful to the user. An example of such a mechanism is shown in FIG. 3B below.

Turning now to FIG. 3B, the electrical polarity of skin 50 may be inverted by, for example, the target electrode 184 that receives its charge from the electrostatic sprayer 1000. When skin achieves electrical polarity corresponding to that of the cosmetic particles 200, the electrical field of skin 50 repels the cosmetic particles 200, thus terminating or at least reducing the effects of the cosmetics on the skin. In the illustrated embodiment, the target electrode 184 is energized by the electrostatic sprayer 1000 (e.g., through the controller 180), but in other embodiments the target electrode 184 may be energized by a dedicated source of voltage that is separate from the electrostatic sprayer 1000.

Figure 4A:
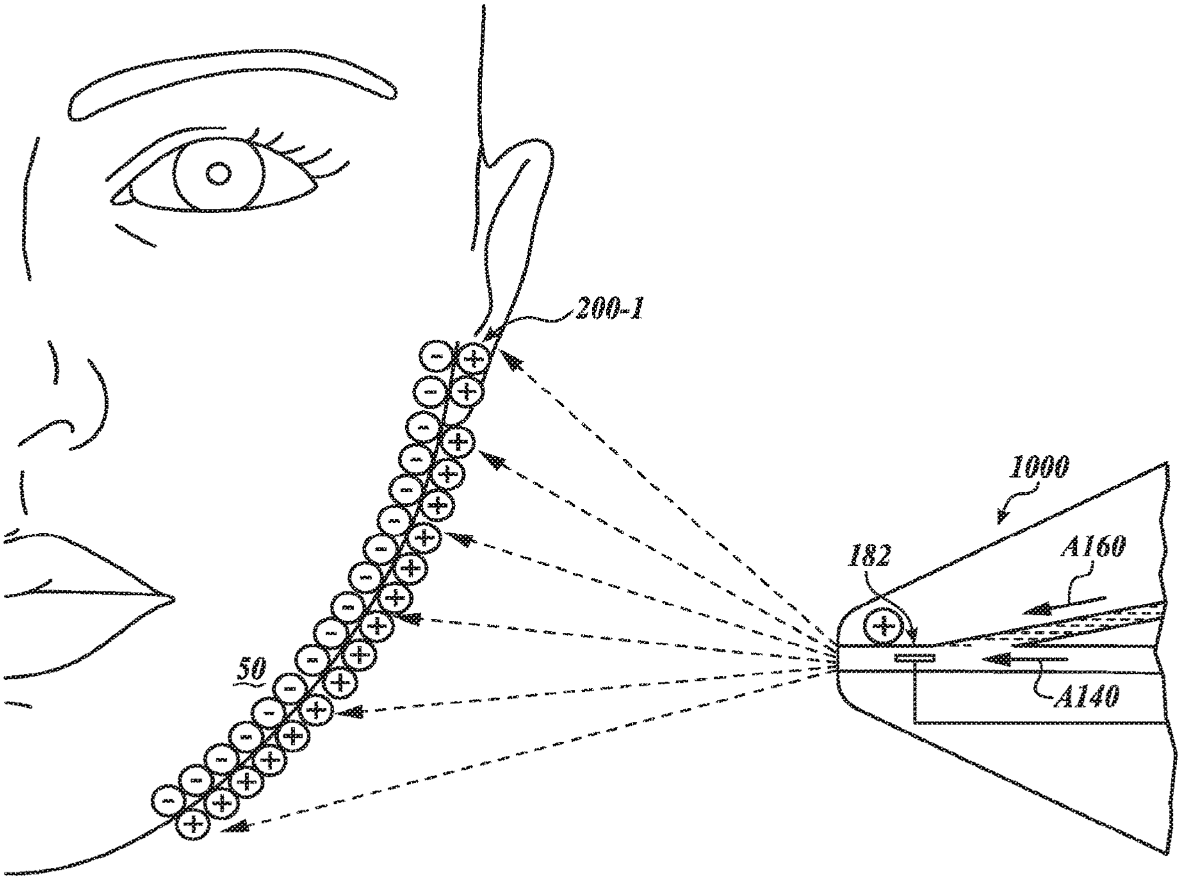
FIGS. 4A and 4B are schematic diagrams of an electrostatic sprayer operating in accordance with the inventive technology.
Figure 4B:
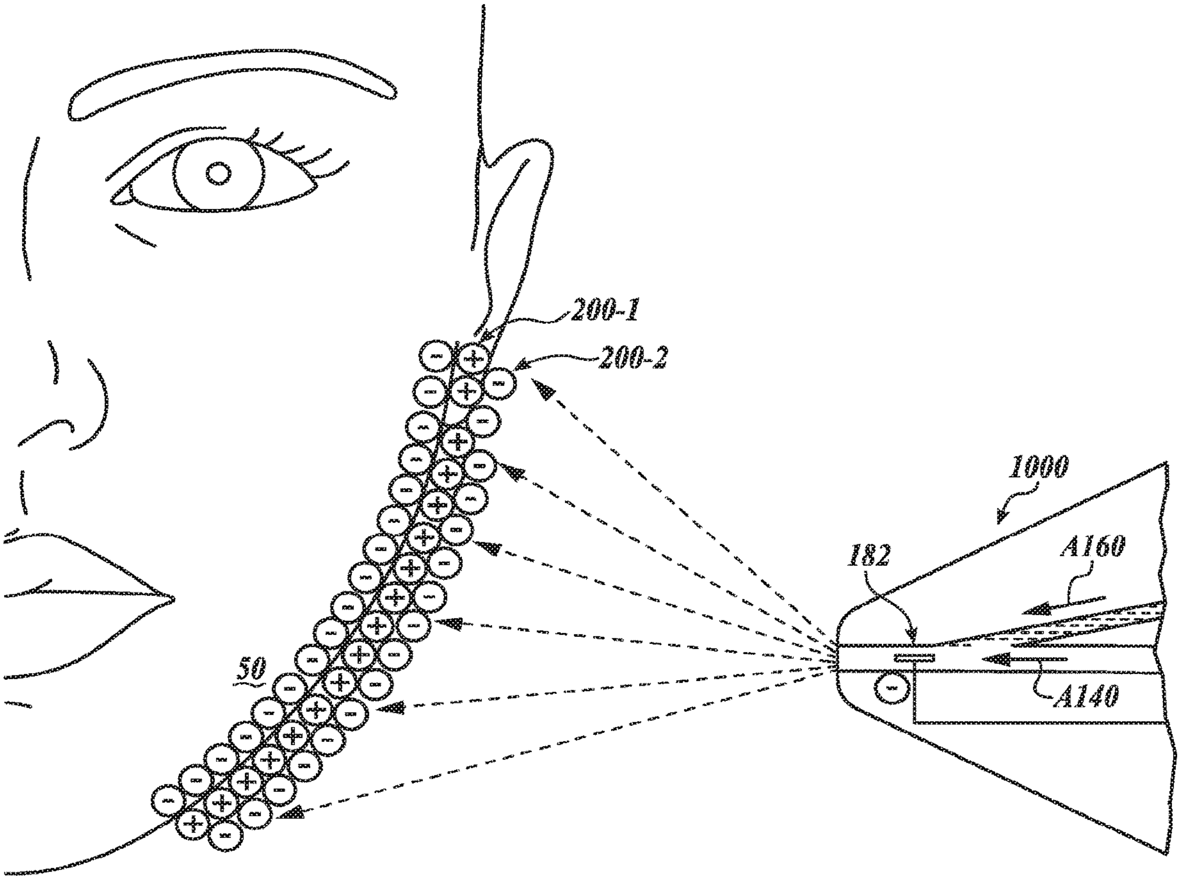

FIGS. 4A and 4B are schematic diagrams of an electrostatic sprayer operating in accordance with the inventive technology. Under some scenarios, the user may benefit from an application of a two-layer cosmetic material. In different embodiments, the components of such two-layer (or multilayer) cosmetics may, for example, create a target color of the combined cosmetic layer, or may create other beneficial effects.

Turning now to FIG. 4A, the electrostatic sprayer 1000 charges the cosmetic particles 200-1, and deposits the particles onto skin 50 to create a first layer of the cosmetic material. In the illustrated embodiment, the cosmetic particles 200-1 are positively charged.

Turning now to FIG. 4B, the electrostatic sprayer 1000 charges the cosmetic particles 200-2 to a negative electrical potential before the particles are deposited onto skin 50 to create a second layer of the cosmetic material. Because the initially deposited cosmetic particles 200-1 are positively charged, an attractive force is created for the incoming negatively charged cosmetic particles 200-2. Therefore, in at least some embodiments, application and retention of the cosmetic material is improved by having a two-layer cosmetic material deposited over skin 50.

Figure 5A:
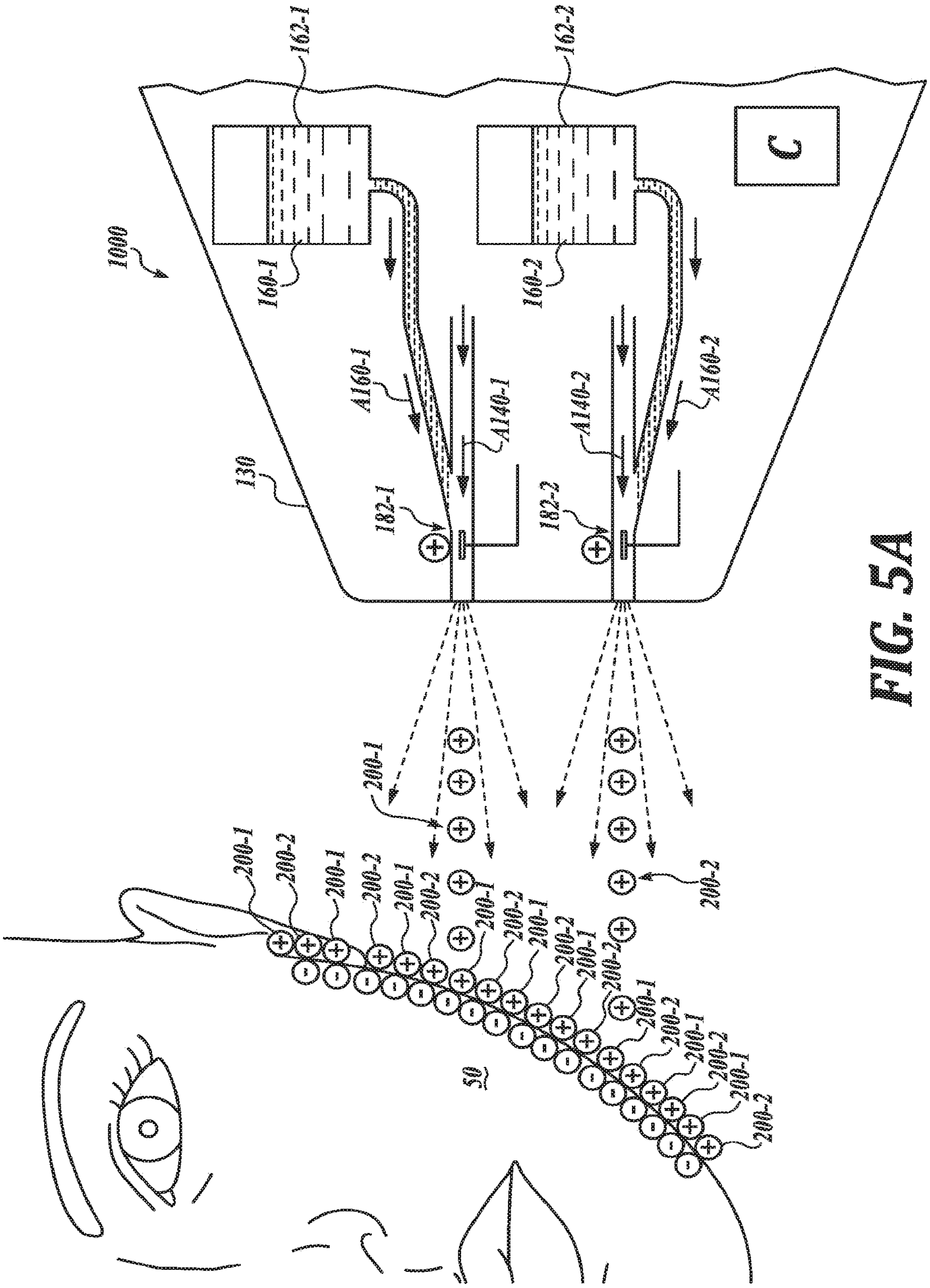
FIGS. 5A and 5B are schematic diagrams of two-component electrostatic sprayers operating in accordance with the inventive technology.
Figure 5B:
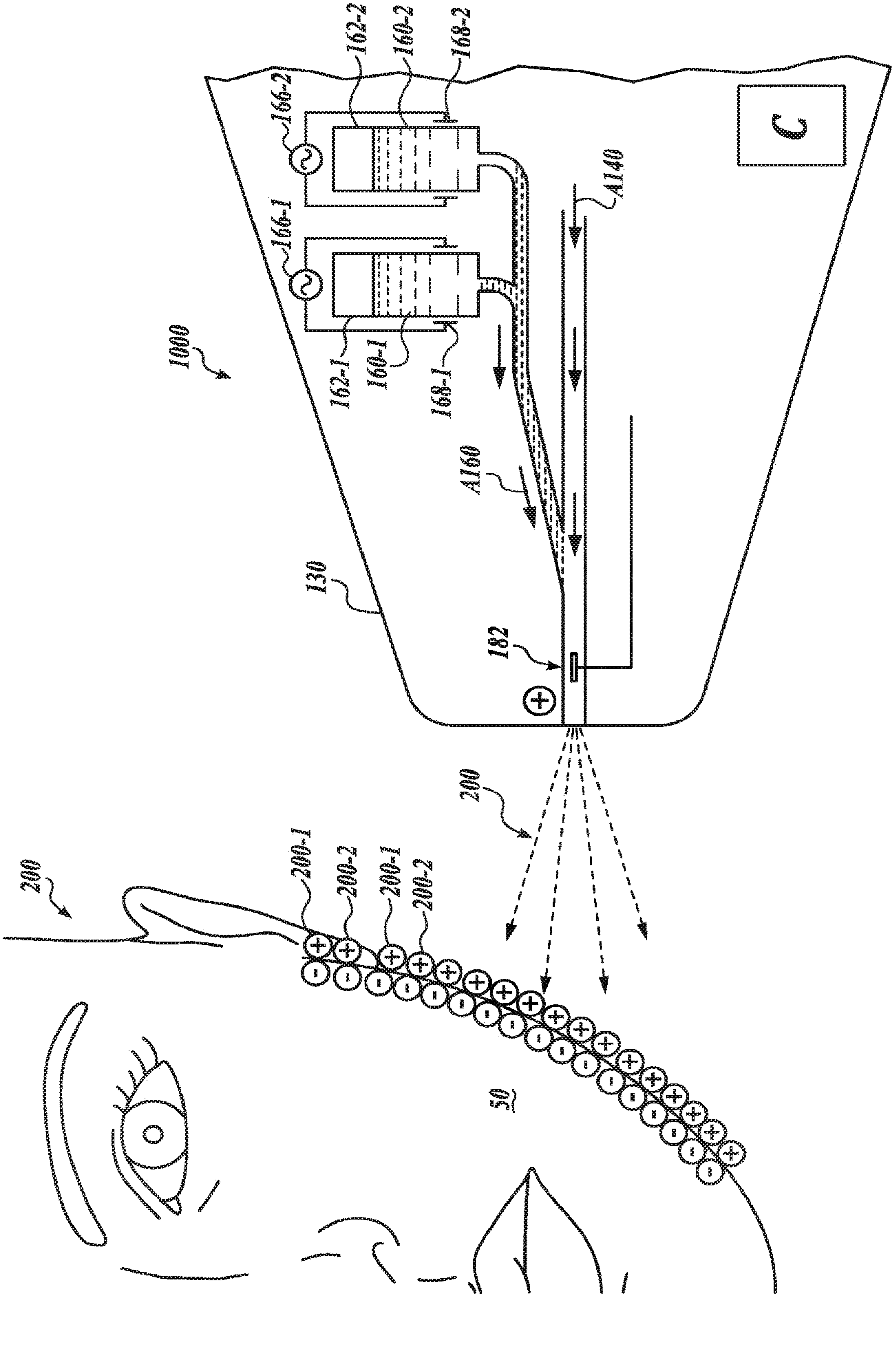

FIGS. 5A and 5B are schematic diagrams of a two-component electrostatic sprayer operating in accordance with the inventive technology. Under some use scenarios, the user may benefit from two-component cosmetics. In different embodiments, the components of such two-component cosmetics may, for example, chemically react, mix to create a target color, mix to create soothing or medical effects, or create other beneficial effects. Mixing of the components of two-component cosmetics (or multiple components of multi-component cosmetics) may occur as these components toward the target surface, or may occur at the target surface, or as a combination of these two scenarios.

Turning now to FIG. 5A, the electrostatic sprayer 1000 includes reservoirs 162-1 and 162-2 that carry cosmetic materials 160-1 and 160-2, respectively. The cosmetic materials 160-1 and 160-2 may be simultaneously atomized and electrically charged by their respective nozzle electrodes 182-1 and 182-2. In the illustrated embodiment, cosmetic particles 200-1 200-2 are charged to a positive potential, but in other embodiments the cosmetic particles can be both charged to a negative potential, or may be charged to different potentials, for example, one cosmetic material being charged to a positive potential and the other cosmetic material being charged to a negative potential. Furthermore, these cosmetic materials may be charged to different charge densities. In the illustrated example, charged cosmetic particles 200 are attracted by a negatively charged target surface 50.

Turning now to FIG. 5B, in the illustrated embodiment, both cosmetic materials 160-1 and 160-2 are fed to the same sprayer nozzle. In some embodiments, the two cosmetic materials react while mixed and while traveling to the target surface. In some embodiments, one or both of cosmetic materials 160-1 and 160-2 are electrically pre-charged by, for example, their corresponding radio frequency (RF) sources 168-1 and 168-2. Without being bound to theory, it is believed that precharging cosmetic materials may affect the ultimate charge of the cosmetic particles 200. In FIGS. 5A and 5B, two cosmetic materials contained in two reservoirs are illustrated, but other numbers of cosmetic materials are also encompassed by this disclosure.

Figure 6A:
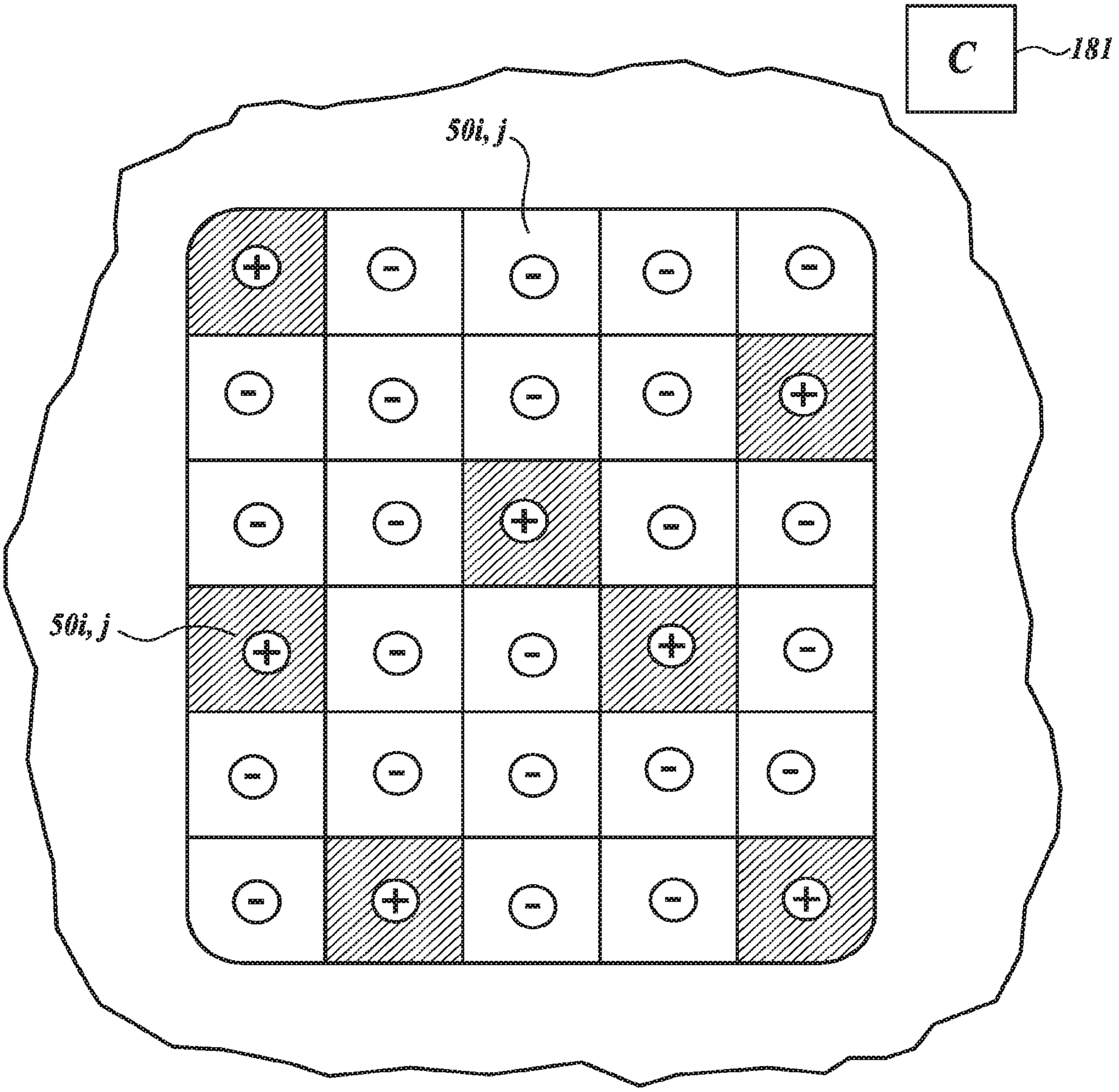
FIG. 6A is a diagram of an electrostatic charge of a target skin in accordance with the inventive technology.

FIG. 6A is a diagram of an electrostatic charge of a target surface in accordance with the inventive technology. In some embodiments, the number of differently charged sub-areas (sub-fields, sub-zones) may be created to direct and/or control application of the cosmetic particles to define some areas. For example, with the illustrated sub-areas 50*i,j*, positively charged cosmetic particles are attracted to the negatively charged sub-areas, and vice versa. The polarity of the individual sub-areas may be controlled by a controller 181, which may be carried by the electrostatic sprayer.

Figure 6B:
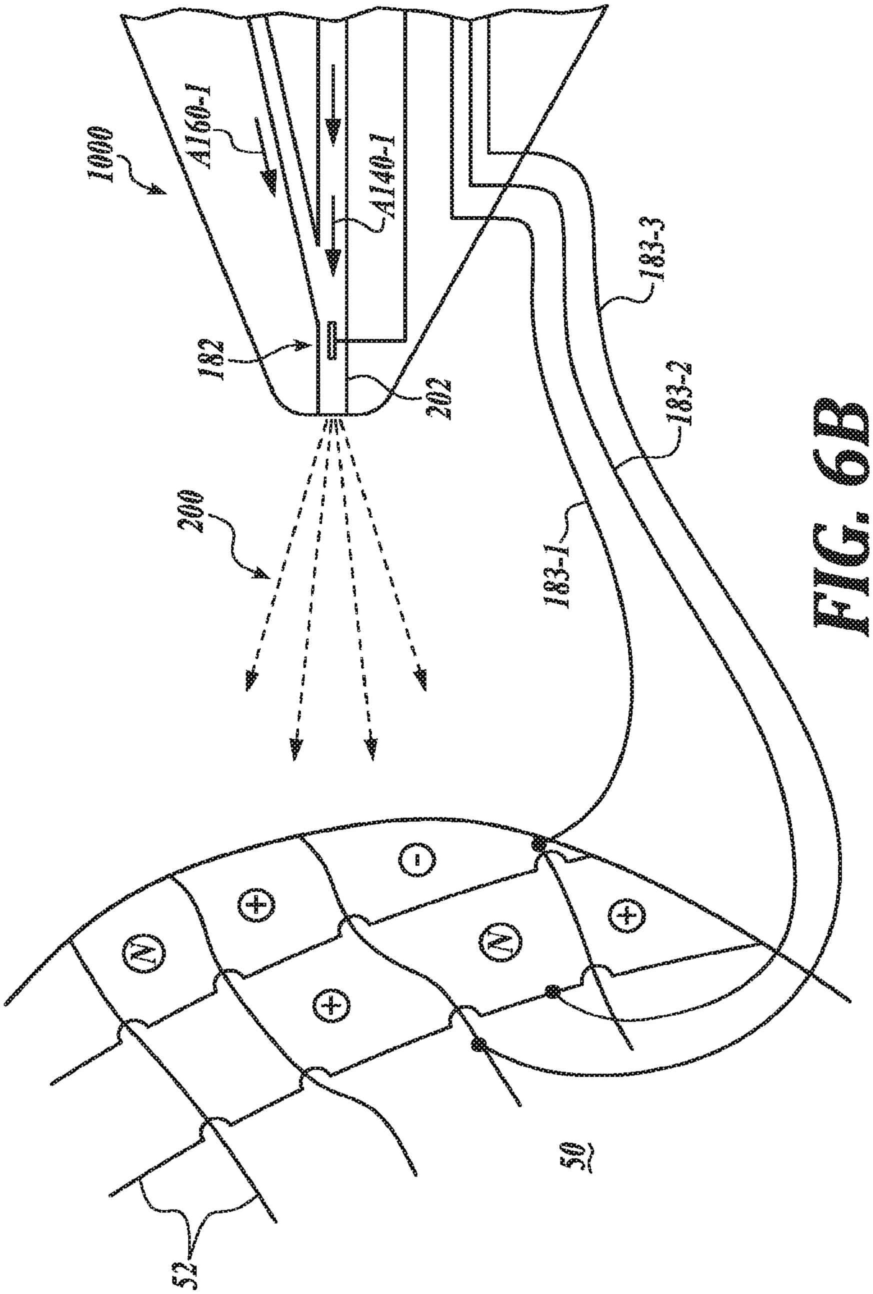
FIG. 6B is a diagram of an electrostatic sprayer in operation in accordance with the inventive technology.

FIG. 6B is a diagram of the electrostatic sprayer 1000 in operation in accordance with the inventive technology. The illustrated surface 50 carries conductive traces 52. In some embodiments, the conductive traces 52 may be directly printed on the surface 50, or may be adhesively attached to the surface 50. Voltage of the traces 52 is controllable through a plurality of conductive lines 183. Different combinations of the voltages in the conductive lines 183 may result in differing polarities (e.g., positive, negative, neutral) applied to the individual zones on the surface. In operation, different polarities of the sub-zones of the surface 50 differentially attract charged cosmetic particles 200, thus providing an improved control of the distribution of the cosmetic particles over the surface. In some embodiments, the polarities of the sub-zones may be changed by changing the voltages of the traces 52, resulting in the corresponding multiple distributions of the attractive forces between the surface 50 and the cosmetic particles 200.

Figure 7:
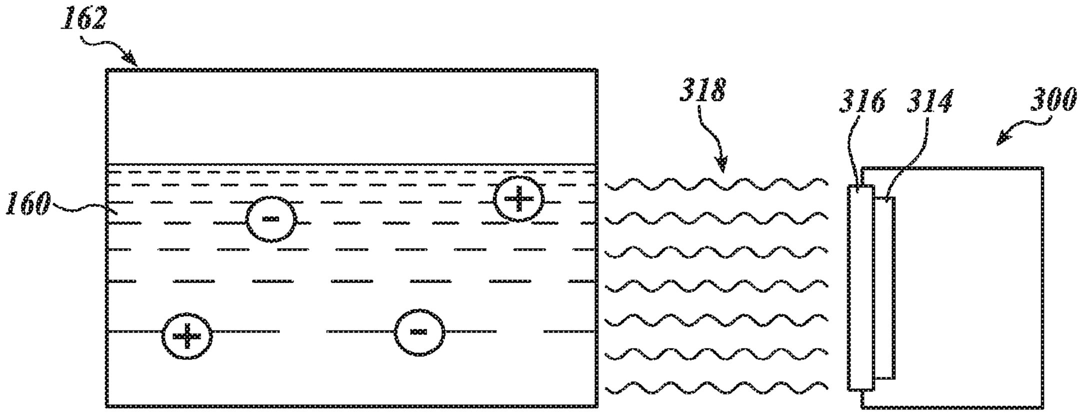
FIG. 7 is a schematic diagram of a cosmetic material pretreatment in accordance with the present disclosure.

FIG. 7 is a schematic diagram of a cosmetic material pretreatment in accordance with the present disclosure. In some embodiments, cosmetic material 160 may be treated by a plasma pre-treatment system 300 that is configured to generate cold plasma 318 by an electrode 314 covered by a dielectric barrier 316. Without being bound to theory, it is believed that pre-charged cosmetic material 160 may affect the ultimate polarity and/or charge density of the cosmetic particles 200. The cartridge 162 that carries the pretreated cosmetic material 160 may be treated and inserted into the electrostatic sprayer 1000 at prescribed time before the treatment to increase effectiveness of the treatment in view of the naturally decaying charges of the cosmetic material in the cartridge.

Many embodiments of the technology described above may take the form of computer- or controller-executable instructions, including routines executed by a programmable computer or controller. Those skilled in the relevant art will appreciate that the technology can be practiced on computer/controller systems other than those shown and described above. The technology can be embodied in a special-purpose computer, application specific integrated circuit (ASIC), controller or data processor that is specifically programmed, configured or constructed to perform one or more of the computer-executable instructions described above. Of course, any logic or algorithm described herein can be implemented in software or hardware, or a combination of software and hardware.

From the foregoing, it will be appreciated that specific embodiments of the technology have been described herein for purposes of illustration, but that various modifications may be made without deviating from the disclosure. Moreover, while various advantages and features associated with certain embodiments have been described above in the context of those embodiments, other embodiments may also exhibit such advantages and/or features, and not all embodiments need necessarily exhibit such advantages and/or features to fall within the scope of the technology. Where methods are described, the methods may include more, fewer, or other steps. Additionally, steps may be performed in any suitable order. Accordingly, the disclosure can encompass other embodiments not expressly shown or described herein.

For the purposes of the present disclosure, lists of two or more elements of the form, for example, "at least one of A, B, and C," is intended to mean (A), (B), (C), (A and B), (A and C), (B and C), or (A, B, and C), and further includes all similar permutations when any other quantity of elements is listed.

The embodiments of the invention in which an exclusive property or privilege is claimed are defined as follows:

1. A system for electrostatic deposition of cosmetic material on a surface, the system comprising:

a housing;

a nozzle configured for breaking the cosmetic material into cosmetic particles and for directing the cosmetic particles out of the housing and toward the surface;

a reservoir configured for holding the cosmetic material, wherein the reservoir is connected to the nozzle;

a nozzle electrode configured proximately to the nozzle, wherein the nozzle electrode is configured to charge the cosmetic particles;

a target electrode configured for charging the surface; and a controller having instructions, which, when executed, cause the controller to:

during a first time period, charge the surface at a first polarity;

charge the cosmetic particles at a second polarity, wherein the second polarity is different from the first polarity; and during a second time period, repel the cosmetic particles from the surface by charging the surface at the second polarity.

2. The system of claim 1, wherein the cosmetic particles comprise solid particles, and wherein the solid particles are configured to receive charge from the nozzle electrode.

3. The system of claim 2, wherein the cosmetic material is selected from a group consisting of a dry shampoo, a deodorant, an antiperspirant, a baby powder, a hairspray, and a combination thereof.

4. The system of claim 1, wherein the controller is further configured to:

after the second time period, charge the cosmetic particles at the first polarity.

5. The system of claim 1, wherein the reservoir is a first reservoir, the cosmetic material is a first cosmetic material, and the cosmetic particles are first cosmetic particles, the system further comprising:

a second reservoir configured for holding a second cosmetic material, wherein the nozzle electrode is configured to charge second cosmetic particles of the second cosmetic material.

6. The system of claim 5, wherein the nozzle is a first nozzle, and the nozzle electrode is a first nozzle electrode, the system further comprising:

a second nozzle configured for breaking the second cosmetic material into the second cosmetic particles and for directing the second cosmetic particles toward the surface; and a second nozzle electrode configured proximately to the second nozzle, wherein the second nozzle electrode is configured to charge the cosmetic particles.

7. The system of claim 6, wherein the first nozzle electrode has the first polarity and the second nozzle electrode has the second polarity.

8. The system of claim 5, wherein the first reservoir is a first insertable cartridge, and the second reservoir is a second insertable cartridge.

9. The system of claim 8, wherein the first material in the first insertable cartridge is pre-charged to a pre-determined charge.

10. The system of claim 5, wherein the first cosmetic particles of the first cosmetic material and the second cosmetic particles of the second cosmetic material are configured to chemically react.

11. The system of claim 1, further comprising:

a plurality of target electrodes configured over the surface, wherein the plurality of target electrodes form a plurality of charge zones on the surface; and a controller having instructions, which, when executed, cause the controller to:

set polarities of individual charge zones of the plurality of charge zones at a first polarity or a second polarity different from the first polarity; and charge the cosmetic particles at the first polarity or the second polarity.

12. A method for electrostatic deposition of cosmetic material on a surface, the method comprising:

flowing the cosmetic material from a reservoir to a nozzle;

breaking the cosmetic material into cosmetic particles in the nozzle;

charging the cosmetic particles by a nozzle electrode, wherein the cosmetic particles are charged at a first polarity;

directing the cosmetic particles toward the surface;

depositing the cosmetic particles on the surface;

charging the surface at a second polarity by a target electrode, wherein the first polarity is different from the second polarity; and repelling the cosmetic particles from the surface by charging the surface at the first polarity.

13. The method of claim 12, wherein the cosmetic particles comprise solid particles, and wherein the solid particles are configured to receive charge from the nozzle electrode.

14. The method of claim 13, wherein the cosmetic material is selected from a group consisting of a dry shampoo, a deodorant, an antiperspirant, a baby powder, a hairspray, and a combination thereof.

15. The method of claim 12, wherein the cosmetic material is held in an insertable cartridge.

16. The method of claim 15, wherein the insertable cartridge is pre-charged to a pre-determined charge.

17. The method of claim 12, further comprising:

depositing the cosmetic particles at the second polarity over the cosmetic particles at the first polarity.

18. The method of claim 12, wherein the cosmetic material is a first cosmetic material, and the cosmetic particles are first cosmetic particles charged at the first polarity, the method further comprising:

charging second cosmetic particles of a second cosmetic material to the second polarity;

simultaneously flowing the first cosmetic particles and the second cosmetic particles toward the surface; and mixing the first cosmetic particles and the second cosmetic particles as the first cosmetic particles and the second cosmetic particles flow toward the surface.

19. The method of claim 18, wherein the first cosmetic particles of the first cosmetic material and the second cosmetic particles of the second cosmetic material chemically react as the first cosmetic particles and the second cosmetic particles flow toward the surface.

20. The method of claim 18, wherein the first cosmetic particles of the first cosmetic material and the second cosmetic particles of the second cosmetic material chemically react on the surface.

21. The method of claim 12, further comprising:

depositing a plurality of target electrodes over the surface, wherein the plurality of target electrodes form a plurality of charge zones on the surface;

setting polarities of individual charge zones of the plurality of charge zones at a first polarity or a second polarity different from the first polarity; and directing the cosmetic particles at the first polarity or the second polarity toward the charge zones on the surface.

* * * * *